US012725831B2

(12) United States Patent
Sato

(10) Patent No.: US 12,725,831 B2
(45) Date of Patent: Sep. 1, 2026

(54) NON-AQUEOUS SECONDARY CELL AND NON-AQUEOUS ELECTROLYTE USED IN SAME

(71) Applicant: Panasonic Intellectual Property Management Co., Ltd., Osaka (JP)

(72) Inventor: Takao Sato, Kanagawa Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 551 days.

(21) Appl. No.: 18/033,614

(22) PCT Filed: Aug. 5, 2021

(86) PCT No.: PCT/JP2021/029087
§ 371 (c)(1),
(2) Date: Apr. 25, 2023

(87) PCT Pub. No.: WO2022/091520
PCT Pub. Date: May 5, 2022

(65) Prior Publication Data

US 2023/0402652 A1 Dec. 14, 2023

(30) Foreign Application Priority Data

Oct. 28, 2020 (JP) ................................ 2020-180194

(51) Int. Cl.

| | |
|---|---|
| ***H01M 10/0567*** | (2010.01) |
| ***H01M 4/525*** | (2010.01) |
| *H01M 4/02* | (2006.01) |

(52) U.S. Cl.
CPC ....... *H01M 10/0567* (2013.01); *H01M 4/525* (2013.01); *H01M 2004/028* (2013.01); *H01M 2300/0025* (2013.01)

(58) Field of Classification Search
CPC ............. H01M 10/0567; H01M 4/525; H01M 2004/028; H01M 2300/0025;
(Continued)

(56) References Cited

U.S. PATENT DOCUMENTS

2012/0308881 A1* 12/2012 Tokuda ............. H01M 10/0567 429/199
2013/0316229 A1 11/2013 Sawa et al.
(Continued)

FOREIGN PATENT DOCUMENTS

CN 103460494 A 12/2013
JP 2004-179146 A 6/2004
(Continued)

OTHER PUBLICATIONS

International Search Report dated Nov. 2, 2021, issued in counterpart International Application No. PCT/JP2021/029087, with English translation. (5 pages).
(Continued)

*Primary Examiner* — Lisa S Park
(74) *Attorney, Agent, or Firm* — WHDA, LLP

(57) ABSTRACT

A non-aqueous electrolyte for a non-aqueous secondary battery includes a non-aqueous solvent, an electrolyte salt, an isocyanate compound, and a nitrile compound having two or more nitrile groups, in which a content $C_{NCO}$ of the isocyanate compound is higher on a mass basis than a content $C_{CN}$ of the nitrile compound.

12 Claims, 1 Drawing Sheet

(58) Field of Classification Search
CPC ......... H01M 10/0525; H01M 10/0569; H01M 4/505; H01M 10/052; Y02E 60/10
See application file for complete search history.

(56) References Cited

U.S. PATENT DOCUMENTS

2013/0330609 A1 12/2013 Sawa et al.
2013/0330610 A1 12/2013 Shigematsu et al.
2014/0017526 A1 1/2014 Iwanaga et al.
2015/0270577 A1* 9/2015 Takezawa ......... H01M 10/0569 429/330
2016/0164143 A1 6/2016 Sawa et al.
2018/0309124 A1* 10/2018 Kanada ............... H01M 10/052
2020/0036042 A1 1/2020 Sawa et al.

FOREIGN PATENT DOCUMENTS

JP 2013-051202 A 3/2013
JP 2013-065540 A 4/2013
JP 2013-251204 A 12/2013
WO 2012/108505 A1 8/2012
WO 2014/112026 A1 7/2014

OTHER PUBLICATIONS

Written Opinion dated Nov. 2, 2021, issued in counterpart International Application No. PCT/JP2021/029087. (5 pages).
Office Action dated Jun. 4, 2025, issued in counterpart CN Application No. 202180073830.5, with partial English translation. (10 pages).
Lu, Y. et al., Layed Lithium-Rich Cathode Materials for Lithium-Ion Batteries, Beijing Institute of Technology Press, p. 22-24, 2020, with English translation (10 pages); cited in CN Office Action dated Jun. 4, 2025.
Myung, S. et al., Nickel-Rich Layered Cathode Materials for Automotive Lithium-Ion Batteries: Achievements and Perspectives, ACS Energy Letters, vol. 2, p. 196-223, 2017. (28 pages); Cited in IN Office Action dated Jul. 3, 2026.
Office Action dated Jul. 3, 2026, issued in counterpart IN Application No. 202347033526, with English translation. (9 pages).

* cited by examiner

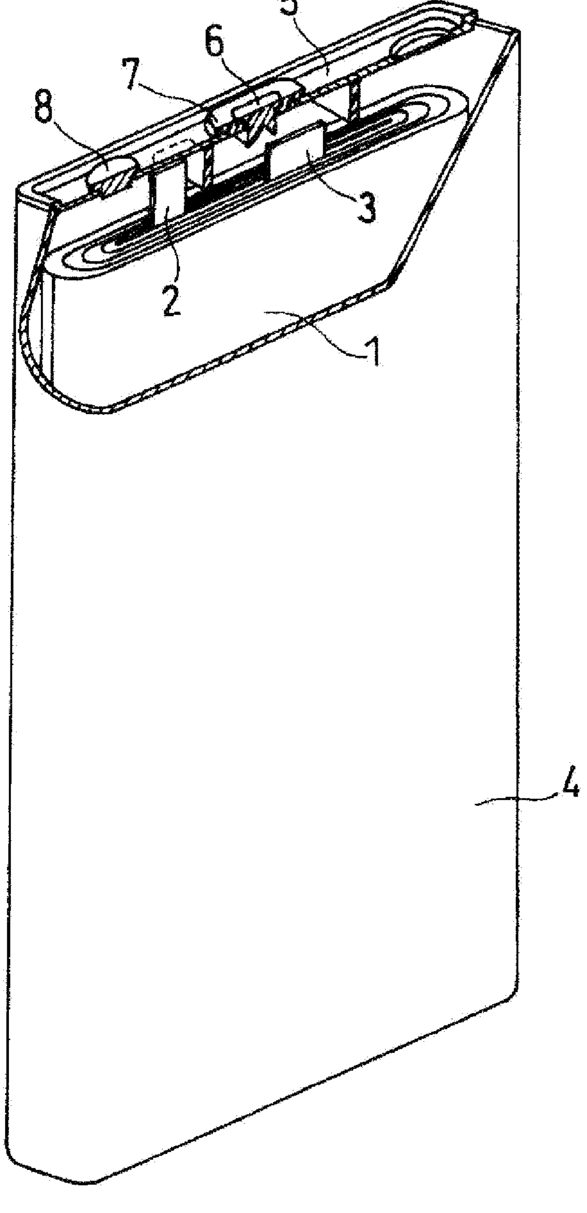
5
6
7
8
3
2
1
4

NON-AQUEOUS SECONDARY CELL AND NON-AQUEOUS ELECTROLYTE USED IN SAME

CROSS-REFERENCE TO RELATED APPLICATIONS

This application is a National Phase Application filed under 35 U.S.C. § 371 of International Application No. PCT/JP2021/029087 filed on Aug. 5, 2021, which claims the benefit of priorities under 35 U.S.C. § 119(a) of Japanese Patent Application No. 2020-180194 filed in Japan on Oct. 28, 2020, the contents of which are incorporated herein by reference.

TECHNICAL FIELD

The present disclosure mainly relates to a non-aqueous electrolyte for a non-aqueous secondary battery.

BACKGROUND ART

Patent Literature 1 proposes a non-aqueous liquid electrolyte containing a non-aqueous solvent and an electrolyte dissolved in the non-aqueous solvent, characterized by containing (A) at least one compound selected from the group consisting of an unsaturated carbonate and a specific cyclic compound, (B) a fluorine-containing ethylene carbonate derivative, and (C) a specific CN compound.

Patent Literature 2 proposes a non-aqueous liquid electrolyte for a lithium battery in which an electrolyte is dissolved in a non-aqueous solvent, characterized by that the non-aqueous electrolyte further contains a nitrile compound and a S═O group-containing compound.

Patent Literature 3 proposes a non-aqueous liquid electrolyte for a non-aqueous electrolyte battery having a positive electrode and a negative electrode both capable of absorbing and releasing metal ions, characterized by that the non-aqueous liquid electrolyte contains, together with an electrolyte and a non-aqueous solvent, (A) a compound having at least two isocyanate groups in a molecule and a compound having at least two cyano groups in a molecule, and (B) the ratio (ratio by mass) of the content of the compound having at least two isocyanate groups in a molecule to the compound having at least two cyano groups in a molecule is 50:50 to 1:99.

CITATION LIST

Patent Literature

Patent Literature 1: Japanese Laid-Open Patent Publication No. 2013-51202

Patent Literature 2: Japanese Laid-Open Patent Publication No. 2004-179146

Patent Literature 3: Japanese Laid-Open Patent Publication No. 2013-65540

SUMMARY OF INVENTION

Non-aqueous secondary batteries represented by lithium ion secondary batteries have a positive electrode, a negative electrode, and a non-aqueous electrolyte. When a metal like copper or iron is present in a non-aqueous secondary battery, which utilizes electrochemical redox reactions, a dissolution-precipitation reaction of the metal occurs, which lowers the voltage of the non-aqueous secondary battery.

One aspect of the present disclosure relates to a non-aqueous electrolyte for a non-aqueous secondary battery, including: a non-aqueous solvent; an electrolyte salt; an isocyanate compound; and a nitrile compound having two or more nitrile groups, wherein a content $C_{NCO}$ of the isocyanate compound is higher on a mass basis than a content $C_{CN}$ of the nitrile compound.

Another aspect of the present disclosure relates to a non-aqueous secondary battery, including: a positive electrode including a positive electrode active material; a separator; a negative electrode facing the positive electrode with the separator interposed between the positive electrode and the negative electrode; and a non-aqueous electrolyte, wherein the non-aqueous electrolyte contains a non-aqueous solvent, an electrolyte salt, an isocyanate compound, and a nitrile compound having two or more nitrile groups, and in the non-aqueous electrolyte, a content $C_{NCO}$ of the isocyanate compound is higher on a mass basis than a content $C_{CN}$ of the nitrile compound.

According to the present disclosure, the drop in voltage of a non-aqueous secondary battery due to a metal dissolution-deposition reaction can be suppressed.

BRIEF DESCRIPTION OF DRAWING

FIG. 1 A partially cut-away schematic oblique view of a non-aqueous secondary battery according to one embodiment of the present disclosure.

DESCRIPTION OF EMBODIMENTS

A non-aqueous electrolyte for a non-aqueous secondary battery according to the present disclosure contains a non-aqueous solvent, an electrolyte salt, an isocyanate compound, and a nitrile compound having two or more nitrile groups (hereinafter sometimes referred to as a "nitrile compound P"). Here, a content $C_{NCO}$ of the isocyanate compound is higher on a mass basis than a content $C_{CN}$ of the nitrile compound P ($C_{NCO}>C_{CN}$).

A non-aqueous secondary battery according to the present disclosure has a positive electrode including a positive electrode active material, a separator, a negative electrode facing the positive electrode with the separator interposed therebetween, and the aforementioned non-aqueous electrolyte.

When a metal is exposed to a positive electrode potential, metal ions may leach out from the metal into the non-aqueous electrolyte in some cases. In addition, from the positive electrode active material, too, metal ions may leach out in some cases. For example, the positive electrode of a non-aqueous secondary battery includes a positive electrode active material, and the positive electrode active material has a high potential and contains a metal component (in many cases, a transition metal). The metal ions dissolved in the non-aqueous electrolyte migrate from the positive electrode side to the negative electrode side, and deposit on the negative electrode side. When such a dissolution-deposition reaction proceeds, the voltage of the non-aqueous secondary battery drops. In a non-aqueous secondary battery, suppressing the dissolution and deposition of the metal is important.

In contrast, when the content (mass %) of the isocyanate compound and the content (mass %) of the nitrile compound P in the non-aqueous electrolyte satisfy $C_{NCO}>C_{CN}$, the metal dissolution-deposit reaction is significantly suppressed, and the drop in battery voltage can be suppressed.

Adding an isocyanate compound or a nitrile compound P alone to the non-aqueous electrolyte also can suppress the metal dissolution-deposition reaction; however, the effect of suppressing the drop in battery voltage is limited. Even when an isocyanate compound and a nitrile compound P are used in combination, if $C_{NCO}>C_{CN}$ is not satisfied (i.e., $C_{NCO}\leq C_{CN}$), the effect of suppressing the drop in battery voltage is limited. Although the detailed mechanism is not clear, surface analysis results have revealed that the isocyanate compound is reduced at the negative electrode, forming a surface film on the negative electrode active material, while the nitrile compound P is oxidized at the positive electrode, forming a surface film on the positive electrode active material. The metal dissolution-deposition reaction is considered to be suppressed when the total amount of the surface film on the negative electrode active material exceeds the total amount of the surface film on the positive electrode active material. The ratio between the amounts of the surface film formed on the positive and negative electrodes is presumed to have an influence on the metal dissolution-deposition reaction, and a larger amount of the isocyanate compound, which forms a surface film on the negative electrode active material, than the nitrile compound P is required.

In the following, a non-aqueous electrolyte secondary battery of the present disclosure will be specifically described for each component element. The non-aqueous electrolyte secondary battery includes, for example, a positive electrode, a negative electrode, a non-aqueous electrolyte, and a separator as described below.

[Non-Aqueous Electrolyte]

The non-aqueous electrolyte contains a non-aqueous solvent, an electrolyte salt, an isocyanate compound, and a nitrile compound P.

It suffices that the content $C_{NCO}$ of the isocyanate compound and the content $C_{CN}$ of the nitrile compound P satisfy $C_{NCO}>C_{CN}$, but the ratio $C_{NCO}/C_{CN}$ of the content $C_{NCO}$ of the isocyanate compound to the content $C_{CN}$ of the nitrile compound may be, for example, in the range of 55/45 to 99/1, may be in the range of 70/30 to 99/1, and may be 80/20 to 99/1.

The content $C_{NCO}$ of the isocyanate compound in the non-aqueous electrolyte is, for example, 0.001 mass % or more and 5 mass % or less, may be 0.001 mass % or more and less than 4 mass %, may be 0.01 mass % or more and less than 4 mass %, and may be 0.1 mass % or more and 2 mass % or less.

The content $C_{CN}$ of the nitrile compound P in the non-aqueous electrolyte is, for example, 0.001 mass % or more and 5 mass % or less, may be 0.001 mass % or more and 2 mass % or less, may be 0.001 mass % or more and less than 1.6 mass %, may be 0.01 mass % or more and 1.5 mass % or less, and may be 0.02 mass % or more and 0.8 mass % or less.

In the non-aqueous secondary battery, during storage or during charge and discharge, the contents of the isocyanate compound and the nitrile compound P in the non-aqueous electrolyte can vary. It suffices, therefore, that the isocyanate compound and the nitrile compound P remain each at a concentration above the detection limit in the non-aqueous electrolyte collected from the non-aqueous secondary battery. The content of the isocyanate compound in the non-aqueous electrolyte collected from the non-aqueous secondary battery may be 0.0001 mass % or more. The content of the nitrile compound P in the non-aqueous electrolyte collected from the non-aqueous secondary battery may be mass % or more.

The contents of the isocyanate compound and the nitrile compound P in the non-aqueous electrolyte can be determined, for example, using gas chromatography under the following conditions.

Instrument used: GC-2010 Plus, available from Shimadzu Corporation

Column: HP-1 (membrane thickness: 1 μm, inner diameter: 0.32 mm, length: 60 m), available from J&W Corporation Column temperature: raised from 50° C. to 90° C. at a temperature rise rate of ° C./min and held at 90° C. for 15 minutes, and then, raised from 90° C. to 250° C. at a temperature rise rate of 10° C./min and held at 250° C. for 15 minutes Split ratio: 1/50

Linear velocity: 30.0 cm/sec

Inlet temperature: 270° C.

Injection amount: 1 μL

Detector: FID 290° C. (sens. $10^1$)

(Isocyanate Compound)

The isocyanate compound may be a monoisocyanate having one isocyanate group, may be a diisocyanate having two isocyanate groups, and may be a polyisocyanate having three or more isocyanate groups. The number of the isocyanate groups included in the isocyanate compound may be five or less, and may be four or less. In particular, a diisocyanate, even with a small amount, is highly effective in suppressing the metal dissolution-deposition reaction, and exhibits excellent stability in the battery.

The isocyanate compound forms a surface film on the surface of the negative electrode active material (e.g., a carbon material, such as graphite), to inhibit the reductive decomposition of the non-aqueous electrolyte. The surface film formed on the negative electrode surface, however, also functions as a resistive body that restricts the migration of lithium ions. The property of the formed surface film differs depending on the number of the isocyanate groups. A diisocyanate produces a surface film which is less resistive than a monoisocyanate, and produces a more homogeneous surface film than a triisocyanate. In order to form a less-resistive and homogeneous surface film, thereby to effectively suppress the metal dissolution-deposition reaction, a diisocyanate having two isocyanate groups is desirable.

Specific examples of the isocyanate compound are shown below, but the isocyanate compound is not limited to the following. The isocyanate compound may be used singly, or in any combination of two or more kinds.

Specific examples of the monoisocyanate include isocyanatomethane, isocyanatoethane, 1-isocyanatopropane, 1-isocyanatobutane, 1-isocyanatopentane, 1-isocyanatohexane, 1-isocyanatoheptane, 1-isocyanatooctane, 1-isocyanatononane, 1-isocyanatodecane, isocyanatocyclohexane, methoxycarbonyl isocyanate, ethoxycarbonyl isocyanate, propoxycarbonyl isocyanate, butoxycarbonyl isocyanate, methoxysulfonyl isocyanate, ethoxysulfonyl isocyanate, propoxysulfonyl isocyanate, butoxysulfonyl isocyanate, fluorosulfonyl isocyanate, methyl isocyanate, butyl isocyanate, phenyl isocyanate, 2-isocyanatoethyl acrylate, 2-isocyanatoethyl methacrylate, and ethyl isocyanate.

Specific examples of the diisocyanate include 1,4-diisocyanatobutane, 1,5-diisocyanatopentane, 1,6-diisocyanatohexane (hexamethylene diisocyanate), 1,7-diisocyanatoheptane, 1,8-diisocyanatooctane, 1,9-diisocyanatononane, 1,10-diisocyanatodecane, 1,3-diisocyanatopropene, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluene diisocyanate, xylene diisocyanate, tolylene diisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, isophorone diisocyanate, bicyclo[2.2.1]heptane-2,5-diylbis(methylisocyanate), bicyclo[2.2.1]heptane-2,6-diylbis(methylisocyanate), 2,4,4-trimethylhexamethylene diisocyanate, 2,2,4-trimethylhexamethylene diisocyanato, hexamethylene diisocyanate, 1,4-phenylene diisocyanate, octamethylene diisocyanate, and tetramethylene diisocyanate.

Specific examples of the triisocyanate include 1,6,11-triisocyanatoundecane, 4-isocyanatomethyl-1,8-octamethylene diisocyanate, 1,3,5-triisocyanate methylbenzene, 1,3,5-tris(6-isocyanatohex-1-yl)-1,3,5-triazine-2,4,6(1H,3H,5H)-trione, and 4-(isocyanatomethyl)octamethylene diisocyanate.

In particular, a compound represented by OCN—$C_nH_{2n}$—NCO, where n is an integer of 1 to 10 (e.g., hexamethylene diisocyanate), a compound having an alicyclic diyl group (e.g., 1,3-bis(isocyanatomethyl)cyclohexane, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophorone diisocyanate), 2,2,4-trimethylhexamethylene diisocyanate, 2,4,4-trimethylhexamethylene diisocyanate, and the like are easily available. These may be used singly or in combination of two or more kinds. These compounds may occupy 50 mass % or more, further 70 mass % or more or 90 mass % or more, of the isocyanate compound in the non-aqueous electrolyte.

(Nitrile Compound P)

The nitrile compound P may be a dinitrile having two nitrile groups or a nitrile compound having three or more nitrile groups. The number of the nitrile groups included in the nitrile compound P may be five or less, and may be four or less. In particular, a dinitrile is highly effective in suppressing the metal dissolution-deposition reaction, and the influence thereof on the battery characteristics is small. However, when a mononitrile is added to the non-aqueous electrolyte, to the contrary, the metal dissolution is facilitated. A nitrile compound having three or more nitrile groups suppress the metal dissolution, but has a tendency to increase the viscosity of the non-aqueous electrolyte. Therefore, a dinitrile having two nitrile groups is desirable.

Specific examples of the nitrile compound P are shown below, but the nitrile compound P is not limited to the following. The nitrile compound P may be used singly, or in any combination of two or more kinds.

Specific examples of the nitrile compound P include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, 3,9-bis(2-cyanoethyl)-2,4,8,10-tetraoxaspiro[5,5]undecane, butanenitrile, and phthalonitrile.

In particular, a compound represented by NC—$C_mH_{2m}$—CN, where m is an integer of 1 to 10, a compound having one phenyl group, and the like are easily available. Examples of such compounds include succinonitrile (NC—$C_2H_4$—CN), glutaronitrile (NC—$C_3H_6$—CN), adiponitrile (NC—$C_4H_8$—CN), pimeronitrile (NC—$O_5H_{10}$—CN), suberonitrile (NC—$C_6H_{12}$—CN), and phthalonitrile (NC—$C_6H_5$—CN). These may be used singly or in combination of two or more kinds. These compounds may occupy 50 mass % or more, further 70 mass % or more, or 90 mass % or more, of the nitrile compound P in the non-aqueous electrolyte.

(Non-Aqueous Solvent)

Examples of the non-aqueous solvent include cyclic carbonic acid esters, chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL), and γ-valerolactone (GVL). The chain carboxylic acid esters are exemplified by methyl formate, ethyl formate, propyl formate, methyl acetate (MA), ethyl acetate, propyl acetate, methyl propionate, ethyl propionate, and propyl propionate. The non-aqueous electrolyte may contain these non-aqueous solvents singly, or in combination of two or more kinds.

(Electrolyte salt) As the electrolyte salt, a lithium salt is preferred. Examples of the lithium salt include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, and imides. Examples of the borates include lithium difluorooxalate borate, and lithium bisoxalate borate. Examples of the imides include lithium bisfluorosulfonyl imide ($LiN(FSO_2)_2$), and lithium bis(trifluoromethanesulfonyl)imide ($LiN(CF_3SO_2)_2$). The non-aqueous electrolyte may contain these electrolyte salts singly or in combination of two or more kinds.

The concentration of the electrolyte salt in the non-aqueous electrolyte is, for example, 0.5 mol/L or more and 2 mol/L or less.

The non-aqueous electrolyte may contain another additive. As the other additive, for example, at least one selected from the group consisting of vinylene carbonate, fluoroethylene carbonate, and vinylethylene carbonate can be used.

[Positive Electrode]

The positive electrode includes a positive electrode active material. The positive electrode usually includes a positive electrode current collector, and a layer of a positive electrode mixture (hereinafter, a positive electrode mixture layer) held on the positive electrode current collector. The positive electrode mixture layer can be formed by applying a positive electrode slurry prepared by dispersing constituent components of the positive electrode mixture in a dispersion medium, onto a surface of the positive electrode current collector, followed by drying. The applied film after drying may be rolled as needed. The positive electrode mixture contains a positive electrode active material as an essential component, and may contain a binder, a thickener, and the like as optional components.

(Positive Electrode Active Material)

The positive electrode active material may be any material that can be used as a positive electrode active material for a non-aqueous secondary battery (esp. lithium ion secondary battery). As a preferred positive electrode active material, for example, a lithium-transition metal composite oxide having a layered rock-salt type structure and containing Ni and at least one selected from the group consisting of Co, Mn, and Al can be used.

In view of achieving a high capacity, it is desirable that the proportion of Ni in the metal elements other than Li in the lithium-transition metal composite oxide is 80 atm % or more. The proportion of Ni in the metal elements other than Li may be 85 atm % or more, and may be 90 atm % or more. The proportion of Ni in the metal elements other than Li is desirably, for example, 95 atm % or less. When defining a range, these upper and lower limits can be combined in any combination.

Hereinafter, a lithium-transition metal composite oxide having a layered rock-salt type structure and containing Ni and at least one selected from the group consisting of Co, Mn, and Al, in which the proportion of Ni in the metal elements other than Li is 80 atm % or more is sometimes referred to as a "composite oxide HN". The composite oxide HN having a layered rock-salt type structure is capable of reversible intercalation and deintercalation of Li ions between the layers.

The higher the proportion of Ni is, the more the lithium ions can be extracted from the composite oxide HN during charge, and the capacity can be increased. However, Ni in the composite oxide HN whose capacity has been increased as above has a tendency to have a higher valence. Also, when the proportion of Ni is increased, the proportions of other elements are relatively decreased. In this case, the crystal structure tends to become unstable especially in a fully charged state, and the transition metal, such as Ni, tends to leach out with repeated charge and discharge. When Ni leaches out from the composite oxide HN with a high Ni content, the particle surfaces tend to change to have a crystal structure into and from which lithium ions are difficult to be reversibly absorbed and released. In the non-aqueous secondary battery according to the present disclosure, despite the use of a composite oxide HN with such a high Ni content, by using a non-aqueous electrolyte containing an isocyanate compound and a nitrile compound P, the leaching of the transition metal can be highly suppressed.

Co, Mn, and Al contribute to stabilize the crystal structure of the composite oxide HN with a high Ni content. However, a lower Co content is desirable in view of the reduction in manufacturing costs. The composite oxide HN with low or no Co content may contain Mn and Al.

The proportion of Co in the metal elements other than Li is desirably 10 atm % or less, more desirably 5 atm % or less, and may contain no Co. In view of the stabilization of the crystal structure of the composite oxide HN, it is desirable to contain 1 atm % or more or 1.5 atm % or more of Co.

The proportion of Mn in the metal elements other than Li may be 10 atm % or less, and may be 5 atm % or less. The proportion of Mn in the metal elements other than Li may be 1 atm % or more, may be 3 atm % or more, and may be 5 atm % or more. When defining a range, these upper and lower limits can be combined in any combination.

The proportion of Al in the metal elements other than Li may be 10 atm % or less, and may be 5 atm % or less. The proportion of Al in the metal elements other than Li may be 1 atm % or more, may be 3 atm % or more, and may be 5 atm % or more. When defining a range, these upper and lower limits can be combined in any combination.

The composite oxide HN is, for example, represented by a formula: $Li_{\alpha}Ni_{(1-x1-x2-y-z)}Co_{x1}Mn_{x2}Al_{y}M_{z}O_{2+\beta}$. The element M is an element other than Li, Ni, Co, Mn, Al, and oxygen.

In the above formula, the a representing the atomic ratio of lithium is, for example, $0.95 \leq \alpha \leq 1.05$. The a increases and decreases during charge and discharge. In the $(2+\beta)$ representing the atomic ratio of oxygen, $\beta$ satisfies $-0.05 \leq \beta \leq 0.05$.

The 1-x1-x2-y-z (=v) representing the atomic ratio of Ni is 0.8 or more, may be 0.85 or more, may be 0.90 or more, and may be 0.95 or more. The v representing the atomic ratio of Ni may be 0.98 or less, and may be 0.95 or less. When defining a range, these upper and lower limits can be combined in any combination.

The x1 representing the atomic ratio of Co is, for example, 0.1 or less ($0 \leq x1 \leq 0.1$), may be 0.08 or less, may be 0.05 or less, and may be 0.01 or less. When x1 is 0, this encompasses a cases where Co is below the detection limit.

The x2 representing the atomic ratio of Mn is, for example, 0.1 or less ($0 \leq x2 \leq 0.1$), may be 0.08 or less, may be 0.05 or less, and may be 0.03 or less. The x2 may be or more, and may be 0.03 or more. Mn contributes to stabilize the crystal structure of the composite oxide HN, and containing Mn, which is inexpensive, in the composite oxide HN is advantageous for cost reduction. When defining a range, these upper and lower limits can be combined in any combination.

They representing the atomic ratio of Al is, for example, 0.1 or less ($0 \leq y \leq 0.1$), may be 0.08 or less, may be 0.05 or less, and may be 0.03 or less. The y may be 0.01 or more, and may be 0.03 or more. Al contributes to stabilize the crystal structure of the composite oxide HN. When defining a range, these upper and lower limits can be combined in any combination.

The z representing the atomic ratio of the element M is, for example, $0 \leq z \leq 0.10$, may be $0 < z \leq 0.05$, may be $0.001 \leq z \leq 0.01$. When defining a range, these upper and lower limits can be combined in any combination.

The element M may be at least one selected from the group consisting of Ti, Zr, Nb, Mo, W, Fe, Zn, B, Si, Mg, Ca, Sr, Sc, and Y. In particular, when at least one selected from the group consisting of Nb, Sr, and Ca is contained in the composite oxide HN, the surface structure of the composite oxide HN can be stabilized, the resistance can be reduced, and the leaching of the metal can be further suppressed. It is more effective when the element M is localized near the particle surfaces of the composite oxide HN.

The contents of the elements constituting the composite oxide HN can be measured using an inductively coupled plasma atomic emission spectroscopy (ICP-AES), an electron probe microanalyzer (EPMA), an energy dispersive X-ray spectroscopy (EDX), or the like.

The composite oxide HN is, for example, secondary particles formed of an aggregate of primary particles. The particle diameter of the primary particles is, for example, 0.05 μm or more and 1 μm or less. The average particle diameter of the secondary particles of the composite oxide HN is, for example, 3 μm or more and 30 μm or less, and may be 5 μm or more and 25 μm or less.

In the present specification, the average particle diameter of the secondary particles means a particle diameter at 50% cumulative volume (volume average particle diameter) in a particle diameter distribution measured by a laser diffraction and scattering method. Such a particle diameter is sometimes referred to as D50. As the measuring apparatus, for example, "LA-750", available from Horiba, Ltd. (HORIBA) can be used.

The positive electrode active material can contain a lithium-transition metal composite oxide other than the composite oxide HN, but preferably, the proportion of the composite oxide HN is high. The proportion of the composite oxide HN in the positive electrode active material is, for example, 90 mass % or more, may be 95 mass % or more, and may be 100%.

(Others)

As the binder, for example, a resin material is used. Examples of the binder include fluorocarbon resins, polyolefin resins, polyamide resins, polyimide resins, acrylic resins, vinyl resins, and rubbery materials (e.g., styrene-butadiene copolymer (SBR)). The binder may be used singly or in combination of two or more kinds.

As the thickener, for example, cellulose derivatives, such as cellulose ethers, are exemplified. Examples of the cellulose derivatives include carboxymethyl cellulose (CMC) and modified products thereof, and methyl cellulose. The thickener may be used singly or in combination of two or more kinds.

As the conductive material, for example, carbon nanotubes (CNTs), conductive fibers other than CNTs, and conductive particles (e.g., carbon black, graphite) are exemplified.

As the dispersion medium used in the positive electrode slurry, although not particularly limited, for example, water, an alcohol, N-methyl-2-pyrrolidone (NMP), and mixed solvents thereof can be used.

As the positive electrode current collector, for example, a metal foil can be used. The positive electrode current collector may be porous. Examples of the porous current collector include a net, a punched sheet, and an expanded metal. The material of the positive electrode current collector may be, for example, stainless steel, aluminum, an aluminum alloy, and titanium. The thickness of the positive electrode current collector is not particularly limited, but is, for example, 1 to 50 μm, and may be 5 to 30 μm.

[Negative Electrode]

The negative electrode includes a negative electrode active material. The negative electrode usually includes a negative electrode current collector, and a layer of a negative electrode mixture (hereinafter, a negative electrode mixture layer) held on the negative electrode current collector. The negative electrode mixture layer can be formed by applying a negative electrode slurry prepared by dispersing constituent components of the negative electrode mixture in a dispersion medium, onto a surface of the negative electrode current collector, followed by drying. The applied film after drying may be rolled as needed.

The negative electrode mixture contains a negative electrode active material as an essential component, and may contain a binder, a thickener, a conductive agent, and the like as optional components.

(Negative Electrode Active Material)

As the negative electrode active material, metal lithium, a lithium alloy, and the like may be used, but a material capable of electrochemically absorbing and releasing lithium ions is preferably used. Such a material includes a carbonaceous material and a Si-containing material. The negative electrode may contain these negative electrode active materials singly, or in combination of two or more kinds.

Examples of the carbonaceous material include graphite, graphitizable carbon (soft carbon), and non-graphitizable carbon (hard carbon). The carbonaceous material may be used singly, or in combination of two or more kinds. In particular, as the carbonaceous material, graphite is preferred because of its excellent stability during charge and discharge and its low irreversible capacity. Examples of the graphite include natural graphite, artificial graphite, and graphitized mesophase carbon particles.

Examples of the Si-containing material include elementary Si, a silicon alloy, and a silicon compound (e.g., silicon oxide), and a composite material including a lithium-ion conductive phase (matrix) and a silicon phase dispersed therein. The silicon oxide is exemplified by $SiO_x$ particles. The x may be, for example, $0.5 \le x < 2$, and may be $0.8 \le x \le 1.6$. The lithium-ion conductive phase can be at least one selected from the group consisting of a Sift phase, a silicate phase, and a carbon phase.

As the binder, the thickener, and the conductive agent, and the dispersion medium used in the negative electrode slurry, for example, the materials exemplified for the positive electrode can be used.

As the negative electrode current collector, for example, a metal foil can be used. The negative electrode current collector may be porous. The material of the negative electrode current collector may be, for example, stainless steel, nickel, a nickel alloy, copper, and a copper alloy. The thickness of the negative electrode current collector is not particularly limited, but is, for example, 1 to 50 μm, and may be 5 to 30 μm.

[Separator]

It is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. As the material of the separator, a polyolefin, such as polypropylene and polyethylene, is preferred.

In an exemplary structure of the non-aqueous electrolyte secondary battery, an electrode group formed by winding the positive electrode and the negative electrode with the separator interposed therebetween is housed together with the non-aqueous electrolyte in an outer body. However, without limited thereto, an electrode group in a different form may be adopted. For example, the electrode group may be of a stacked type formed by stacking the positive electrode and the negative electrode with the separator interposed therebetween. The type of the non-aqueous electrolyte secondary battery is also not particularly limited, and may of a cylindrical, prismatic, coin, button, or laminate type.

In the following, the structure of a prismatic non-aqueous electrolyte secondary battery as an example of the non-aqueous electrolyte secondary battery according to the present invention will be described with reference to FIG. 1.

The battery includes a bottomed prismatic battery case 4, and an electrode group 1 and a non-aqueous electrolyte housed in the battery case 4. The electrode group 1 has a long negative electrode, a long positive electrode, and a separator interposed between the positive electrode and the negative electrode. A negative electrode current collector of the negative electrode is electrically connected, via a negative electrode lead 3, to a negative electrode terminal 6 provided on a sealing plate 5. The negative electrode terminal 6 is electrically insulated from the sealing plate 5 by a gasket 7 made of resin. A positive electrode current collector of the positive electrode is electrically connected, via a positive electrode lead 2, to the back side of the sealing plate 5. That is, the positive electrode is electrically connected to the battery case 4 serving as a positive electrode terminal. The periphery of the sealing plate 5 is engaged with the opening end of the battery case 4, and the engaging portion is laser-welded. The sealing plate 5 is provided with an injection port for non-aqueous electrolyte, which is closed with a sealing plug 8 after electrolyte injection.

The present disclosure will be more specifically described below with reference to Examples and Comparative Examples, but the present invention is not limited to the following Examples.

Examples 1 to 38 and Comparative Examples 1 to 5

A non-aqueous secondary battery was fabricated and evaluated in the following procedure.

(1) Production of Positive Electrode

First, 100 parts by mass of positive electrode active material particles ($LiNi_{0.88}Co_{0.09}Al_{0.03}O_2$), 1 part of carbon nanotubes, 1 part by mass of polyvinylidene fluoride, and an appropriate amount of NMP were mixed, to obtain a positive electrode slurry. Next, the positive electrode slurry was applied onto a surface of an aluminum foil, and the applied film was dried, and then rolled, to form a positive electrode mixture layer (thickness: 95 μm, density: 3.6 g/cm$^3$) on both sides of the aluminum foil. A positive electrode was thus obtained.

(2) Production of Negative Electrode

First, 98 mass parts of a negative electrode active material (graphite), 1 part by mass of a sodium salt of carboxymethyl cellulose (CMC-Na), 1 part by mass of SBR, and an appropriate amount of water were mixed, to prepare a negative electrode slurry. Next, the negative electrode slurry was applied onto a surface of a copper foil serving as a negative electrode current collector, and the applied film was dried, and then rolled, to form a negative electrode mixture layer on both sides of the copper foil.

(3) Preparation of Non-Aqueous Electrolyte (Liquid Electrolyte)

To a mixed solvent of EC and EMC (EC:EMC=3:7 (ratio by volume)), $LiPF_6$ and, an isocyanate compound and a nitrile compound P as shown in Table 1 were dissolved each at a content as shown in Tables 1 and 2. The concentration of the $LiPF_6$ in the non-aqueous electrolyte was set to 1.0 mol/L. The contents of the isocyanate compound and the nitrile compound P in the liquid electrolyte each refer to an initial concentration in the liquid electrolyte immediately after preparation.

The isocyanate compounds and the nitrile compounds P shown in Tables 1 and 2 are listed below.

<Isocyanate Compound>

BIMCH13: 1,3-bis(isocyanatomethyl)cyclohexane

HMDI: 1,6-diisocyanatohexane(hexamethylene-1,6-diisocyanate)

<Nitrile Compound P>

ScCN: succinonitrile (NC—$C_2H_4$—CN)

AdCN: adiponitrile (NC—$C_4H_8$—CN)

(4) Fabrication of Non-Aqueous Electrolyte Secondary Battery

The positive electrode was cut into a predetermined shape, to obtain a positive electrode for evaluation. On the positive electrode, a region of 20 mm×20 mm for being allowed to function as a positive electrode, and a connection region of 5 mm×5 mm for connection with a tab lead were allocated. The positive electrode mixture layer on the connection region was scraped off, to expose the positive electrode current collector. Thereafter, the exposed portion of the positive electrode current collector was connected to a positive electrode tab lead, and a predetermined area around the periphery of the positive electrode tab lead was covered with an electrically insulating tab film. In Examples 1 to 38 and Comparative Examples 1 to 5, a metal copper ball of approximately 100 μm in diameter was intentionally embedded near the center of the positive electrode mixture layer.

The negative electrode was cut into a similar shape to that of the positive electrode, to obtain a negative electrode for evaluation. Like in the positive electrode, the negative electrode mixture layer on the connection region was scraped off, to expose the negative electrode current collector. Thereafter, like in the positive electrode, the exposed portion of the negative electrode current collector was connected to a negative electrode tab lead, and a predetermined area around the periphery of the negative electrode tab lead was covered with an electrically insulating tab film.

A cell was fabricated using the positive and negative electrodes for evaluation. First, the positive electrode and the negative electrode were placed to face each other such that the positive and negative electrode mixture layers were overlapped with each other with a polypropylene separator (thickness: 30 μm) interposed therebetween, to form an electrode plate group. Next, an Al laminate film (thickness: 100 μm) cut into a 60×90 mm rectangular shape was folded in half, and the edge of the long side of 60 mm was heat-sealed, into a 60×45 mm tubular shape. Thereafter, the formed electrode plate group was placed inside the tube, which was then sealed, with the end surface of the Al laminate film aligned with the thermally welded resin of each tab lead. Next, the non-aqueous liquid electrolyte was injected from the short side of the Al laminate film where thermal sealing was not applied, to allow the non-aqueous liquid electrolyte to impregnate into each mixture layer. Finally, the end face of the Al laminate film from which the electrolyte had been injected was sealed, to obtain evaluation cells A1 to A38 of Examples 1 to 38 and evaluation cells B1 to B5 of Comparative Examples 1 to 5.

(5) Battery Evaluation

The evaluation cell was sandwiched between a pair of clamps of 80×80 cm stainless steel (thickness: 2 mm) and secured at a pressure of 0.2 MPa.

First, in a 25° C. thermostatic bath, five cycles of charge and discharge were performed at a constant current of 0.05 C (1 C is a current value at which the design capacity is discharged in one hour). The charge and the discharge were terminated at the battery voltage having reached 4.2 V and 2.5 V, respectively, and between the charge and the discharge, the battery was left to stand in an open circuit for 20 minutes.

(6) Evaluation

In a 25° C. temperature environment, the battery was constant-current charged at a current of 0.3 It until the voltage reached 4.1 V, and then constant-voltage charged at a constant voltage of 4.1 V until the current reached 0.05 It. Subsequently, the battery was stored in a 25° C. temperature environment, the drop in voltage and the rate of increase in direct current resistance (DCIR) after 100 hours were determined. The results are shown in Tables 1 and 2.

The rate of increase in DCIR was determined by, before and after the storage for 100 hours, in a 25° C. temperature environment, constant-current charging the battery at a constant current of 0.3 It until the voltage reached 4.1 V, then, constant-voltage charging the battery at a constant voltage of 4.1 V until the current reached 0.05 It, and subsequently, discharging the battery at a constant current of 0.3 It for 100 minutes, so that the state of charge (SOC) reached 50%, and measuring the voltage values when the SOC 50% battery was discharged for 10 seconds at current values of 0 A, 0.1 A, 0.5 A, and 1.0 A, respectively. The relationship between the discharge current values and the voltage values after 10 seconds was linearly approximated by a least squares method, and from the absolute value of a slope of the line, a DCIR (initial DCIR) was calculated. The ratio of the DCIR after 100 cycles to the initial DCIR was calculated as a DCIR increase rate, using the following equation.

$$\text{DCIR increase rate (\%)}=\{(\text{DCIR at 100th cycle}-\text{initial DCIR})\}/\text{initial DCIR}\times 100$$

TABLE 1

| | isocyanate compound | | nitrile compound P | | | Drop in | DCIR increase |
|---|---|---|---|---|---|---|---|
| | material | $C_{NCO}$ (mass %) | material | $C_{CN}$ (mass %) | $C_{NCO}/C_{CN}$ | voltage (mV) | rate (%) |
| B1 | — | — | — | — | — | 3081 | — |
| B2 | — | — | AdCN | — | 0/100 | 284 | 7 |
| B3 | HMDI | 0.001 | AdCN | 0.001 | 50/50 | 2941 | 2 |
| B4 | HMDI | 0.001 | AdCN | 0.003 | 25/75 | 2770 | 2 |
| B5 | HMDI | 0.001 | AdCN | 0.1 | 1/99 | 767 | 8 |
| A1 | BIMCH13 | 4 | ScCN | 1.6 | 70/30 | 5 | 108 |
| A2 | BIMCH13 | 2 | ScCN | 0.8 | 70/30 | 5 | 6 |
| A3 | BIMCH13 | 0.1 | ScCN | 0.04 | 70/30 | 7 | 0.5 |
| A4 | BIMCH13 | 0.001 | ScCN | 0.0004 | 70/30 | 7 | 0 |
| A5 | BIMCH13 | 4 | AdCN | 1.6 | 70/30 | 4 | 120 |
| A6 | BIMCH13 | 2 | AdCN | 0.8 | 70/30 | 6 | 8 |
| A7 | BIMCH13 | 0.1 | AdCN | 0.04 | 70/30 | 9 | 0.2 |
| A8 | BIMCH13 | 0.001 | AdCN | 0.0004 | 70/30 | 14 | 0 |
| A9 | BIMCH13 | 4 | ScCN | 1 | 80/20 | 6 | 79 |
| A10 | BIMCH13 | 2 | ScCN | 0.5 | 80/20 | 4 | 3 |
| A11 | BIMCH13 | 0.1 | ScCN | 0.025 | 80/20 | 9 | 0.4 |
| A12 | BIMCH13 | 0.001 | ScCN | 0.00025 | 80/20 | 12 | 0 |
| A13 | BIMCH13 | 4 | AdCN | 1 | 80/20 | 6 | 81 |
| A14 | BIMCH13 | 2 | AdCN | 0.5 | 80/20 | 12 | 8 |
| A15 | BIMCH13 | 0.1 | AdCN | 0.025 | 80/20 | 17 | 0.5 |
| A16 | BIMCH13 | 0.001 | AdCN | 0.00025 | 80/20 | 16 | 0 |
| A17 | BIMCH13 | 4 | ScCN | 0.04 | 99/1 | 4 | 70 |
| A18 | BIMCH13 | 2 | ScCN | 0.02 | 99/1 | 4 | 1 |
| A19 | BIMCH13 | 0.1 | ScCN | 0.001 | 99/1 | 8 | 0.5 |
| A20 | BIMCH13 | 0.001 | ScCN | 0.00001 | 99/1 | 16 | 0 |
| A21 | BIMCH13 | 4 | AdCN | 0.04 | 99/1 | 2 | 80 |
| A22 | BIMCH13 | 2 | AdCN | 0.02 | 99/1 | 5 | 9 |
| A23 | BIMCH13 | 0.1 | AdCN | 0.001 | 99/1 | 10 | 0.2 |
| A24 | BIMCH13 | 0.001 | AdCN | 0.00001 | 99/1 | 12 | 0 |

TABLE 2

| | isocyanate compound | | nitrile compound P | | | Drop in | DCIR increase |
|---|---|---|---|---|---|---|---|
| | material | $C_{NCO}$ (mass %) | material | CCN (mass %) | $C_{NCO}/C_{CN}$ | voltage (mV) | rate (%) |
| A25 | HMDI | 4 | ScCN | 1.6 | 70/30 | 3 | 108 |
| A26 | HMDI | 2 | ScCN | 0.8 | 70/30 | 7 | 9 |
| A27 | HMDI | 0.1 | ScCN | 0.04 | 70/30 | 16 | 3 |
| A28 | HMDI | 0.001 | ScCN | 0.0004 | 70/30 | 270 | 0 |
| A29 | HMDI | 4 | AdCN | 1.6 | 70/30 | 6 | 120 |
| A30 | HMDI | 2 | AdCN | 0.8 | 70/30 | 9 | 6 |
| A31 | HMDI | 4 | ScCN | 1 | 80/20 | 6 | 79 |
| A32 | HMDI | 2 | ScCN | 0.5 | 80/20 | 11 | 7 |
| A33 | HMDI | 4 | AdCN | 1 | 80/20 | 6 | 8 |
| A34 | HMDI | 2 | AdCN | 0.5 | 80/20 | 23 | 11 |
| A35 | HMDI | 4 | ScCN | 0.04 | 99/1 | 4 | 95 |
| A36 | HMDI | 2 | ScCN | 0.02 | 99/1 | 29 | 8 |
| A37 | HMDI | 4 | AdCN | 0.04 | 99/1 | 7 | 99 |
| A38 | HMDI | 2 | AdCN | 0.02 | 99/1 | 91 | 9 |

Table 1 shows that the drop in voltage was extremely severe in the batteries B1 and B2 without using a diisocyanate and the batteries B3 to B5 satisfying $C_{NCO} \leq C_{CN}$. Comparison between the batteries B2 and B5 including the same amount of the nitrile compound P shows that in B2 without using a diisocyanate, the drop in voltage was smaller than in B5 with using a diisocyanate. On the other hand, the drop in voltage was significantly suppressed in the batteries A1 to A38 satisfying $C_{NCO} > C_{CN}$. It would be understood that the DCIR tends to increase when an isocyanate compound or a nitrile compound P is added to the liquid electrolyte, but its increase rate can be suppressed by restricting the adding amount.

INDUSTRIAL APPLICABILITY

The non-aqueous secondary battery according to the present disclosure is suitably applicable as a main power source for mobile communication devices, portable electronic devices, a power source for in-vehicle use, and the like. The application, however, is not limited to these.

REFERENCE SIGNS LIST

1: electrode group
2: positive electrode lead
3: negative electrode lead
4: battery case
5: sealing plate
6: negative electrode terminal
7: gasket
8: sealing plug

The invention claimed is:

1. A non-aqueous electrolyte for a non-aqueous secondary battery, comprising:
- a non-aqueous solvent;
- an electrolyte salt;
- an isocyanate compound having one or more isocyanate groups, at least one isocyanate group containing an alicyclic diyl group; and
  - a nitrile compound having two or more nitrile groups, wherein:
    - a content $C_{NCO}$ of the isocyanate compound is higher on a mass basis than a content $C_{CN}$ of the nitrile compound, and
    - a ratio $C_{NCO}/C_{CN}$ of the content $C_{NCO}$ of the isocyanate compound to the content $C_{CN}$ of the nitrile compound is in the range of 70/30 to 99/1.

2. The non-aqueous electrolyte for a non-aqueous secondary battery according to claim 1, wherein:
- the content $C_{NCO}$ of the isocyanate compound is 0.001 mass % or more and 5 mass % or less.

3. The non-aqueous electrolyte for a non-aqueous secondary battery according to claim 1, wherein:
- the content $C_{NCO}$ of the isocyanate compound is less than 4 mass %, and the content $C_{CN}$ of the nitrile compound is less than 1.6 mass %.

4. The non-aqueous electrolyte for a non-aqueous secondary battery according to claim 1, wherein the ratio $C_{NCO}/C_{CN}$ of the content is in the range of 80/20 to 99/1.

5. The non-aqueous electrolyte for a non-aqueous secondary battery according to claim 1, wherein the isocyanate compound has two or more isocyanate groups.

6. The non-aqueous electrolyte for a non-aqueous secondary battery according to claim 5, wherein the isocyanate compound is a diisocyanate compound.

7. The non-aqueous electrolyte for a non-aqueous secondary battery according to claim 5, wherein the diisocyanate compound includes at least one selected from the group consisting of 1,3-bis(isocyanatomethyl) cyclohexane, dicyclohexylmethane-4,4'-diisocyanate, bicyclo[2.2.1] heptane-2,5-diylbis (methylisocyanate), bicyclo[2.2.1] heptane-2,6-diylbis (methylisocyanate), and isophorone diisocyanate.

8. The non-aqueous electrolyte for a non-aqueous secondary battery according to claim 1, wherein the nitrile compound is a dinitrile compound.

9. The non-aqueous electrolyte for a non-aqueous secondary battery according to claim 8, wherein the dinitrile compound includes at least one selected from the group consisting of succinonitrile, glutaronitrile, adiponitrile, pimelonitrile, and suberonitrile.

10. A non-aqueous secondary battery, comprising:
- a positive electrode including a positive electrode active material; a separator; a negative electrode facing the positive electrode with the separator interposed between the positive electrode and the negative electrode; and a non-aqueous electrolyte, wherein:
- the non-aqueous electrolyte contains a non-aqueous solvent, an electrolyte salt, an isocyanate compound having one or more isocyanate groups, of which at least one isocyanate group contains an alicyclic diyl group, and a nitrile compound having two or more nitrile groups, and
- in the non-aqueous electrolyte:
  - a content $C_{NCO}$ of the isocyanate compound is higher on a mass basis than a content $C_{CN}$ of the nitrile compound, and
  - a ratio $C_{NCO}/C_{CN}$ of the content $C_{NCO}$ of the isocyanate compound to the content $C_{CN}$ of the nitrile compound is in the range of 70/30 to 99/1.

11. The non-aqueous secondary battery according to claim 10, wherein
- the positive electrode active material includes a lithium-transition metal composite oxide having a layered rock-salt type structure and containing Ni and at least one selected from the group consisting of Co, Mn, and Al, and
- a proportion of Ni in metal elements other than Li in the lithium-transition metal composite oxide is 80 atm % or more.

12. The non-aqueous electrolyte for a non-aqueous secondary battery according to claim 1, wherein the content $C_{CN}$ of the nitrile compound is 0.001 mass % or more and 5 mass % or less.

* * * * *